(12) United States Patent
Zhou et al.

(10) Patent No.: US 10,666,325 B2
(45) Date of Patent: *May 26, 2020

(54) NEAR-FIELD COMMUNICATION (NFC) SYSTEM AND METHOD FOR HIGH PERFORMANCE NFC AND WIRELESS POWER TRANSFER WITH SMALL ANTENNAS

(71) Applicant: Nan Jing Qiwei Technology Limited, Jiangsu Province (CN)

(72) Inventors: Ruogu Zhou, East Lansing, MI (US); Qingbin Wang, Guangdong (CN)

(73) Assignee: NAN JING QIWEI TECHNOLOGY LIMITED, Jiangsu Province (CN)

( * ) Notice: Subject to any disclaimer, the term of this patent is extended or adjusted under 35 U.S.C. 154(b) by 29 days.

This patent is subject to a terminal disclaimer.

(21) Appl. No.: 15/461,609

(22) Filed: Mar. 17, 2017

(65) Prior Publication Data

US 2017/0288736 A1   Oct. 5, 2017

Related U.S. Application Data

(63) Continuation of application No. PCT/CN2016/080854, filed on May 2, 2016.

(30) Foreign Application Priority Data

Apr. 1, 2016   (CN) .......................... 2016 1 0203930

(51) Int. Cl.
   *H04B 5/00*   (2006.01)
   *H01Q 1/22*   (2006.01)
   (Continued)

(52) U.S. Cl.
   CPC .......... *H04B 5/0037* (2013.01); *H01Q 1/2225* (2013.01); *H01Q 1/248* (2013.01);
   (Continued)

(58) Field of Classification Search
   CPC .. H02J 7/025; H02J 50/10; H02J 50/80; H02J 7/0029; H02J 50/12; H03F 3/195;
   (Continued)

(56) References Cited

U.S. PATENT DOCUMENTS 8,614,526 B2   12/2013   Cook
9,491,007 B2   11/2016   Black
(Continued)

FOREIGN PATENT DOCUMENTS

CN   104253491 A   12/2014
CN   104578219 A   4/2015
(Continued)

*Primary Examiner* — Yuwen Pan
*Assistant Examiner* — Paul P Tran
(74) *Attorney, Agent, or Firm* — Rabin & Berdo, P.C.

(57) ABSTRACT

A method for a near-field communication (NFC) tag to perform NFC and wireless power transfer (WPT) with an NFC reader, the NFC tag having an antenna resonant circuit, of which a quality factor (Q-factor) is no lower than 50 in a high-Q mode of the NFC tag, and no higher than 25 in a low-Q mode of the NFC tag. The method includes continuously preforming steps of detecting an NFC radio frequency (RF) field generated by the NFC reader, measuring strength of the NFC RF field, operating in the high-Q mode for the WPT upon determining that the strength of the NFC RF field is larger than a predetermined threshold, operating in the low-Q mode for the NFC upon determining that the strength of the NFC RF field is smaller than the predetermined threshold, and transmitting a response back to the NFC reader.

6 Claims, 15 Drawing Sheets

(51) Int. Cl.
*H01Q 1/24* (2006.01)
*G06K 19/07* (2006.01)

(52) U.S. Cl.
CPC ......... *H04B 5/0031* (2013.01); *H04B 5/0081* (2013.01); *G06K 19/0723* (2013.01); *G06K 19/0726* (2013.01)

(58) Field of Classification Search
CPC .. H03F 3/245; H03F 3/45179; H03F 3/45641; H03F 3/45475; H04B 5/0012; H04B 5/0031; H04B 5/0037; H04B 5/0056; H04B 5/0062; H04B 5/0075; H04B 5/0081; H04B 5/0087; H04B 5/0093; H04B 7/00; H04B 13/005; H01Q 1/2216; H01Q 1/2225; G06K 7/10158; G06K 7/10237; G06K 19/0723; G06K 19/0726; G06K 19/07756; G06K 7/10366; G06K 7/10415; G06K 19/0707; G06K 19/0712; G06K 19/00715; G06K 19/073; G06K 19/007762; H01F 38/14; H03J 3/20; H03J 7/12; H04L 25/0278; H04L 27/04; G07C 9/00309; G07C 9/28
USPC ........................................ 455/41.1, 41.2, 411
See application file for complete search history.

(56) References Cited

U.S. PATENT DOCUMENTS

| | | | |
|---|---|---|---|
| 9,729,003 | B1 | 8/2017 | Chow |
| 9,819,394 | B2 | 11/2017 | Shana'a |
| 2009/0058657 | A1 | 3/2009 | Tuttle |
| 2009/0101716 | A1 | 4/2009 | Mani |
| 2009/0153300 | A1* | 6/2009 | Meier ................. G06K 19/0723 340/10.1 |
| 2009/0195366 | A1* | 8/2009 | Meier ................. G06K 7/10297 340/10.51 |
| 2009/0271047 | A1 | 10/2009 | Wakamatsu |
| 2010/0030207 | A1 | 2/2010 | Hancock |
| 2010/0068998 | A1 | 3/2010 | Zyambo |
| 2010/0190436 | A1* | 7/2010 | Cook ....................... H04B 5/00 455/41.1 |
| 2010/0311327 | A1 | 12/2010 | Hamada |
| 2010/0311328 | A1* | 12/2010 | Kargl .................. G06K 7/0008 455/41.2 |
| 2011/0148720 | A1 | 6/2011 | Yao |
| 2012/0095531 | A1 | 4/2012 | Derbas |
| 2012/0169136 | A1 | 7/2012 | Lisi |
| 2012/0293006 | A1* | 11/2012 | Kim ..................... H04B 5/0031 307/104 |
| 2013/0002033 | A1 | 1/2013 | Fuchs |
| 2013/0109305 | A1 | 5/2013 | Savoj |
| 2013/0181517 | A1 | 7/2013 | Maguire |
| 2013/0253612 | A1 | 9/2013 | Chow |
| 2013/0281016 | A1 | 10/2013 | McFarthing |
| 2014/0002244 | A1* | 1/2014 | Sirinamaratana .... G06K 19/077 340/10.1 |
| 2014/0086586 | A1 | 3/2014 | Voutilainen |
| 2014/0111017 | A1 | 4/2014 | Kim |
| 2014/0187150 | A1* | 7/2014 | McFarthing ......... H04B 5/0037 455/41.1 |
| 2014/0191585 | A1 | 7/2014 | Gulak |
| 2014/0256273 | A1* | 9/2014 | Pelosi ..................... H01Q 9/04 455/78 |
| 2014/0323043 | A1 | 10/2014 | Shana'a |
| 2015/0031315 | A1 | 1/2015 | Pieber |
| 2015/0118977 | A1 | 4/2015 | Emmanuel |
| 2015/0195013 | A1 | 7/2015 | Mach |
| 2015/0379387 | A1 | 12/2015 | Richley |
| 2016/0028446 | A1 | 1/2016 | Moon |
| 2016/0182263 | A1 | 6/2016 | Ramakrishnan |
| 2016/0241087 | A1 | 8/2016 | Bae |
| 2016/0249157 | A1 | 8/2016 | Fine |
| 2016/0308588 | A1 | 10/2016 | Jensen |
| 2017/0180010 | A1 | 6/2017 | Michel |
| 2017/0250728 | A1 | 8/2017 | Afsahi |
| 2017/0337461 | A1 | 11/2017 | Jesme |

FOREIGN PATENT DOCUMENTS

| | | |
|---|---|---|
| CN | 104604077 A | 5/2015 |
| CN | 204442353 U | 7/2015 |
| WO | WO-2010/025157 | 3/2010 |

* cited by examiner

NEAR-FIELD COMMUNICATION (NFC) SYSTEM AND METHOD FOR HIGH PERFORMANCE NFC AND WIRELESS POWER TRANSFER WITH SMALL ANTENNAS

BACKGROUND OF THE INVENTION

1. Technical Field

The present invention relates generally to wireless communication and wireless power transfer (WPT), and more specifically to a Near-field Communication (NFC) system and method for high performance NFC and wireless power transfer with small antennas.

2. Background Information

NFC technology became a popular short-distant secure communication approach in recent years. NFC leverages the fast decaying magnetic field as its communication medium, and realizes a short communication distance of merely a few centimeters, which grants high security and usability.

As shown in FIG. 1, there exist two types of typical NFC interfaces, which are NFC Reader 101 and NFC Tag 102. Near-field communication is usually conducted between these two interfaces. NFC is a half-duplex communication system, which contains two communication links, i.e., Reader->Tag link 103 and Tag->Reader link 105.

Reader->Tag link 103: NFC Reader 101 generates an oscillating Magnetic Field 104 with a center frequency of 13.56 MHz as information carrier. NFC Reader 101 maintains the presence of the Magnetic Field 104 throughout the entire communication process, regardless of the active communication link. The carrier is modulated by NFC Reader 101 to transmit information for the Reader->Tag link 103. When the NFC Tag 102 is in the vicinity of the magnetic field 104, it collects the energy carried by the field, and demodulates the information superimposed on the field to retrieve information. To ensure sufficient bandwidth, the antenna quality factor of the NFC Tag 102 is sufficiently low (<30).

Tag->Reader link 105: Conventional NFC tag interfaces are passive interfaces that do not emit any radio frequency (RF) energy. They rely on the passive load modulation on Magnetic Field 104 for data transmission. Specifically, passive NFC tag interfaces modify the impedance of the load that connects to the antenna for transmission. The variation of the load impedance varies the strength of the Magnetic Field 104. This results in controlled variation of the current flowing through the reader's antenna, which can be measured to demodulate the information.

Because the NFC reader interface emits high power in communication, it is usually adopted by devices with abundant energy, such as smartphones, tablets, and POS terminals. On the other hand, NFC tag interfaces are usually employed by low power devices, like smart cards and wearable devices.

NFC Tag 102 can be configured to collect the energy carried by the oscillating magnetic field 104, to power the interface itself and other connected devices. This is called as "NFC energy harvesting," which is widely utilized on applications like smart cards and smart tags.

FIG. 2 shows the typical architecture of conventional passive NFC tag interfaces. Antenna 201 is comprised of one or many loops of conductive wires, which receive the energy and the modulated information carried by the oscillating magnetic field. Antenna match circuit 202 transforms the impedance of Antenna 201 to a suitable value. Demodulator 203 demodulates the received signal and recovers the original information. Load Modulator 205 modulates the impedance of the load connecting to the Antenna 201 to transmit information. Data Interface 204 is connected with external components like microcontrollers (MCU) via a data bus, which is used for exchanging data and configuration. Rectifier and Regulator 206 converts the received RF energy to regulated DC (direct current) energy that could be used for powering system components.

FIG. 3 shows the typical architecture of NFC reader interfaces. Antenna 301 is comprised of one or many loops of conductive wires, which generate oscillating magnetic field, transmit, and receive NFC signals. Antenna match circuit 302 transforms the impedance of Antenna 301 to a suitable value for improving efficiency. Modulator 304 modulates the signal used for generating oscillating magnetic field according to the data to be transmitted. Antenna Driver 303 amplifies the signal Modulator 304 generated, and drives Antenna 301 via Antenna match circuit 302. To improve power efficiency, Antenna Driver 303 usually has low output impedance. Demodulator 309 measures and tracks the strength of the current flowing through Antenna 301, and demodulates the superimposed signal. MCU 307 manages the entire interface, and its tasks include: assembling and dissembling NFC frames, data integrity verification, data exchange via Data Interface 305, controlling and management of on-chip components. Data Interface 305 is the communication interface between the NFC reader and external components, and is usually in the form of SPI (Serial Peripheral Interface), I²C (Inter-Integrated Circuit), or UART (universal asynchronous receiver/transmitter). FIFO (First In First Out buffer) 306 serves as a bidirectional buffer between Data Interface 305 and MCU 307. Clock System 308 generates the necessary clocks for the NFC reader interface, including the 13.56 MHz carrier frequency. On-chip Power Supply 310 provides regulated power and reference for the NFC reader interface.

Conventional NFC system has two major disadvantages. First, passive NFC tag interface requires an antenna of a large size to realize a reasonable communication distance. Due to the weak signal generated by passive load modulation with a low-Q antenna, passive NFC tag interfaces must use sufficiently large antennas to increase the coupling between the antennas of NFC reader and passive tag interfaces. When the antenna is too small, the low coupling results even weaker passive load modulation signal that cannot be correctly received by the NFC reader. Second, the low-Q antenna systems of NFC system lead to low wireless transfer efficiency, which only allows very little power to be collected by the passive tag NFC interface (10 mW to 20 mW). Such limited power can only support very simple operations, like read/program internal memory.

Many current and most next-generation smart devices like wearable devices, smart cards, and Internet-of-Things (IoT) have small form-factors that cannot afford large NFC antennas. However, small antennas significantly limit the performance and reliability of NFC, resulting in very short communication distance and unreliable connection.

Many current and next-generation NFC applications such as wearable devices, smart cards, and smart sensors require significantly higher NFC energy harvesting capacity than current NFC products could provide, due to their sophisticated functions and high processing power. The extremely limited NFC energy harvesting capability significantly limits the performance of these devices.

To solve the weak signal problem caused by small NFC antennas, current mainstream solutions employ active modulation techniques to replace passive load modulation on the NFC tag interfaces. Active modulation techniques actively emit RF signals that do not rely on the carrier signal, a.k.a., the oscillating magnetic field. As active modulation can emit arbitrarily high power, small antennas can yield the similar communication performance as larger antennas. However, active modulation is not a perfect solution to this problem. First of all, since active modulation generates RF signals when the carrier signal is still present, it requires precise phase and frequency synchronization of the generated RF signal to the carrier frequency. This calls for complex PLL (phase-locked loop), antenna drivers, and phase tracking circuits, which greatly increase system cost and power consumption. Moreover, active modulation technology cannot support NFC energy harvesting due to its principle of operation. It requires external power to operate. Therefore, applications relying on NFC energy harvesting, like smart cards and smart sensors, are incompatible with the active modulation technology.

To mitigate the problem of limited NFC energy harvesting capability on NFC tag interfaces, current solutions actively decrease the power consumption of devices, so that the limited harvested power can still support normal operation. These solutions include employing advanced IC (integrated circuit) manufacturing techniques (e.g., from 130 nm to 90 nm process), increasing device sleep time, lowering device operating frequency, etc. However, these methods solve the problem at the expense of cost or performance.

BRIEF SUMMARY OF THE INVENTION

One embodiment of the invention relates to a near-field communication (NFC) reader for NFC and wireless power transfer. The NFC reader has an antenna resonant circuit that includes an antenna for transmitting and receiving signals, a multi-Q antenna matching circuit for adjusting a quality factor (Q-factor) of the antenna resonant circuit, and an antenna driver for driving the antenna through the multi-Q antenna matching circuit. The NFC reader also includes a microcontroller (MCU) for controlling the multi-Q antenna matching circuit, the MCU being configured to control the multi-Q antenna matching circuit to switch between a high-Q mode for the wireless power transfer and a low-Q mode for the NFC.

Another embodiment of the invention relates to a NFC tag for NFC and wireless power reception. The NFC tag includes an antenna resonant circuit that has an antenna for transmitting and receiving signals, and a multi-Q antenna matching circuit for adjusting a Q-factor of the antenna resonant circuit. The multi-Q antenna matching circuit switches between a high-Q mode for the wireless power reception and a low-Q mode for the NFC, based on whether field strength for the NFC is larger than a predetermined threshold.

Yet another embodiment of the invention relates to a NFC tag for NFC and wireless power reception. The NFC tag includes first and second resonant circuits that are separate from each other. The first antenna resonant circuit is configured to perform the NFC, and includes a first antenna for transmitting and receiving signals, and a first antenna matching circuit connected to the first antenna, a Q-factor of the first antenna resonant circuit being no higher than 25. The second antenna resonant circuit is configured to perform the wireless power reception, and includes a second antenna for transmitting and receiving the signals, and a second antenna matching circuit connected to the second antenna. The Q-factor of the second antenna resonant circuit is no lower than 50.

DETAILED DESCRIPTIONS OF THE INVENTION

The present invention relates to an NFC reader interface and a passive NFC tag interface, which are specially optimized for working with small antennas and NFC energy harvesting. The disclosed NFC reader and passive tag interfaces are fully compatible with current NFC standards, therefore they can work with any other NFC device.

Analysis of NFC Energy Harvesting Efficiency

NFC energy harvesting is a special case of inductive coupling wireless power transfer. For any inductive coupling wireless power transfer system, the maximum energy transfer efficiency $\eta_{max}$ can be expressed as:

$$\eta_{max} = \frac{U^2}{\left(1 + \sqrt{U^2 + 1}\right)^2} \quad (1)$$

$$U = k\sqrt{Q_1 Q_2} \quad (2)$$

where k is the coupling coefficient between the antennas of NFC reader and tag, $Q_1$ and $Q_2$ are the Q-factors of the reader's and the tag's antenna resonant circuits when oscillating at 13.56 MHz, respectively. Note that $\eta_{max}$ is the maximum efficiency a wireless power transfer system could reach. The actual efficiency also depends on system source-load impedance match.

Figure 1:
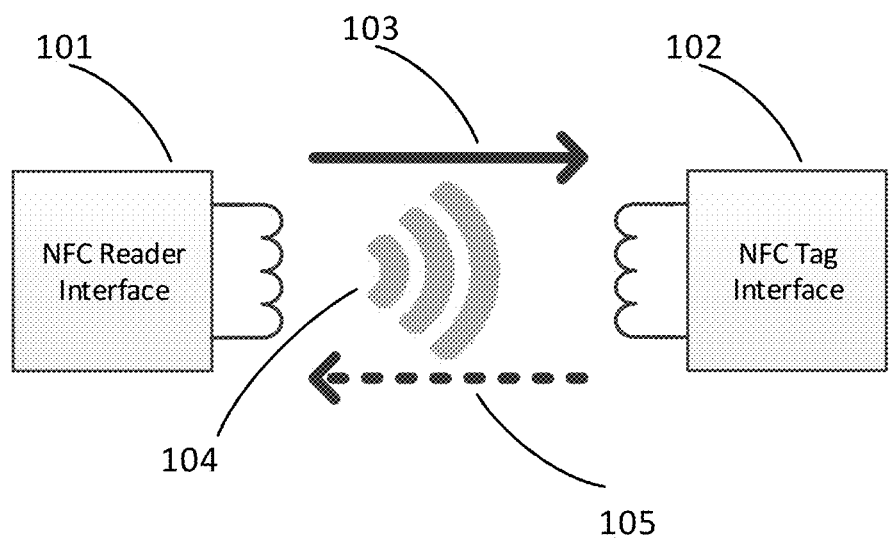
FIG. 1 is an illustration of a typical NFC system.
Figure 2:
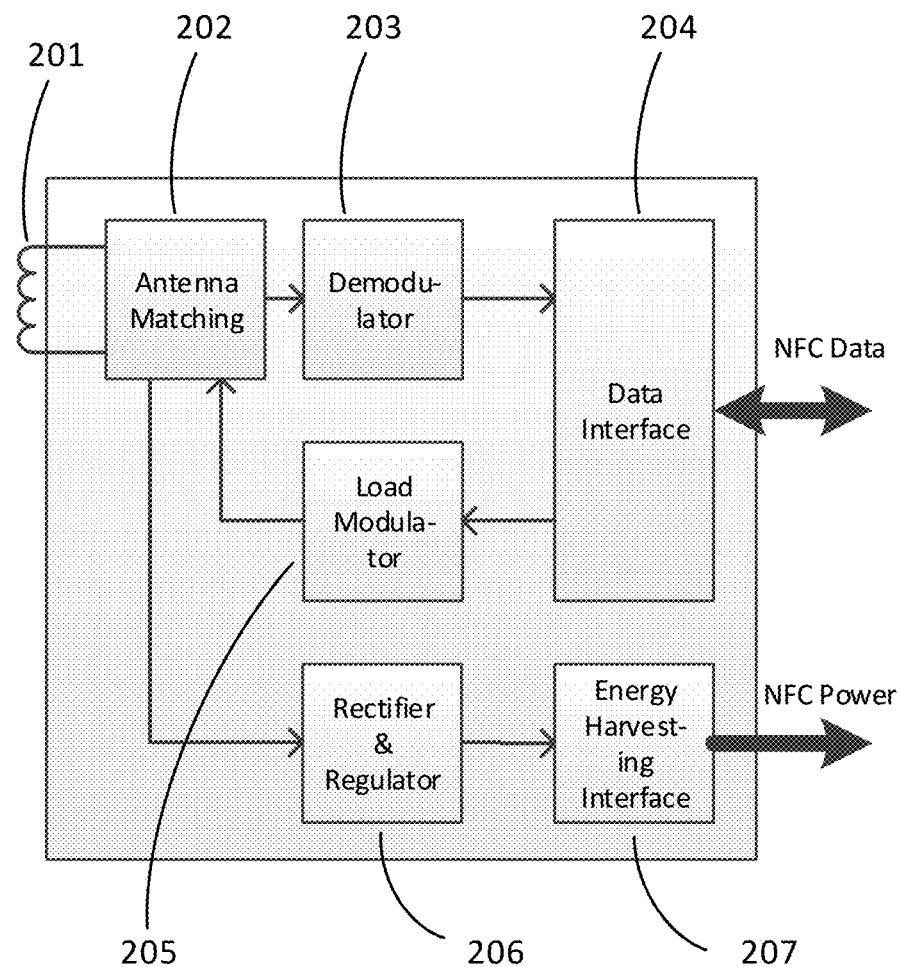
FIG. 2 illustrates the architecture of a typical NFC tag.
Figure 3:
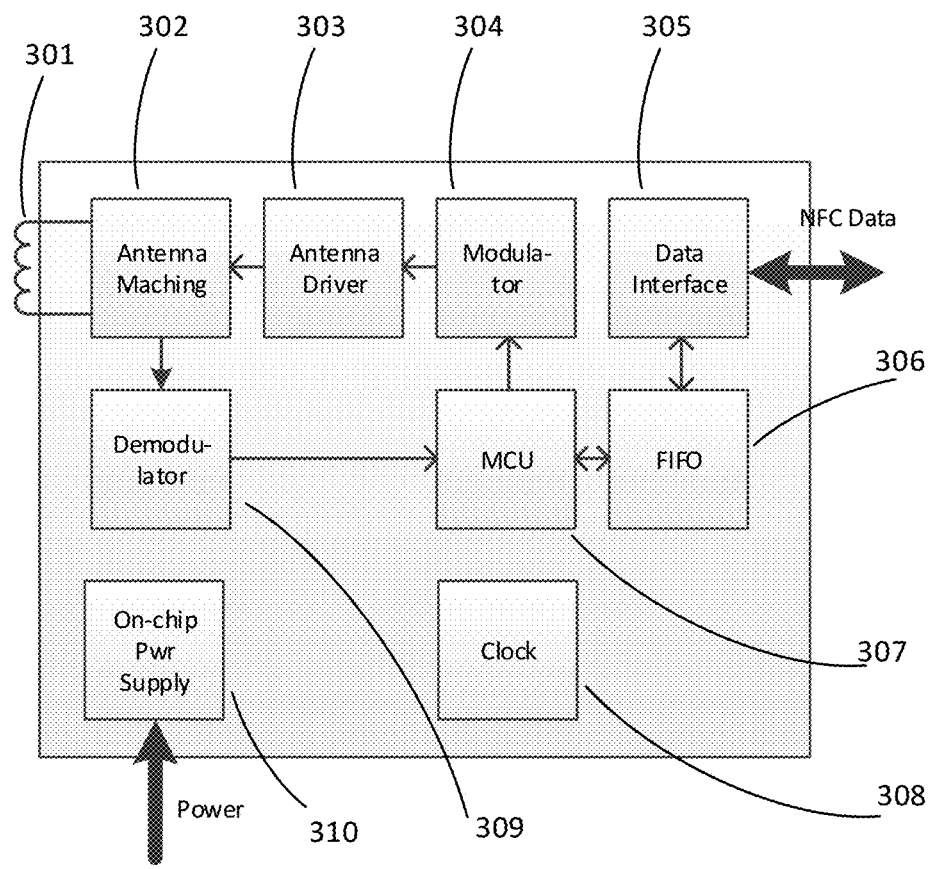
FIG. 3 illustrates the architecture of a typical NFC reader.
Figure 4:
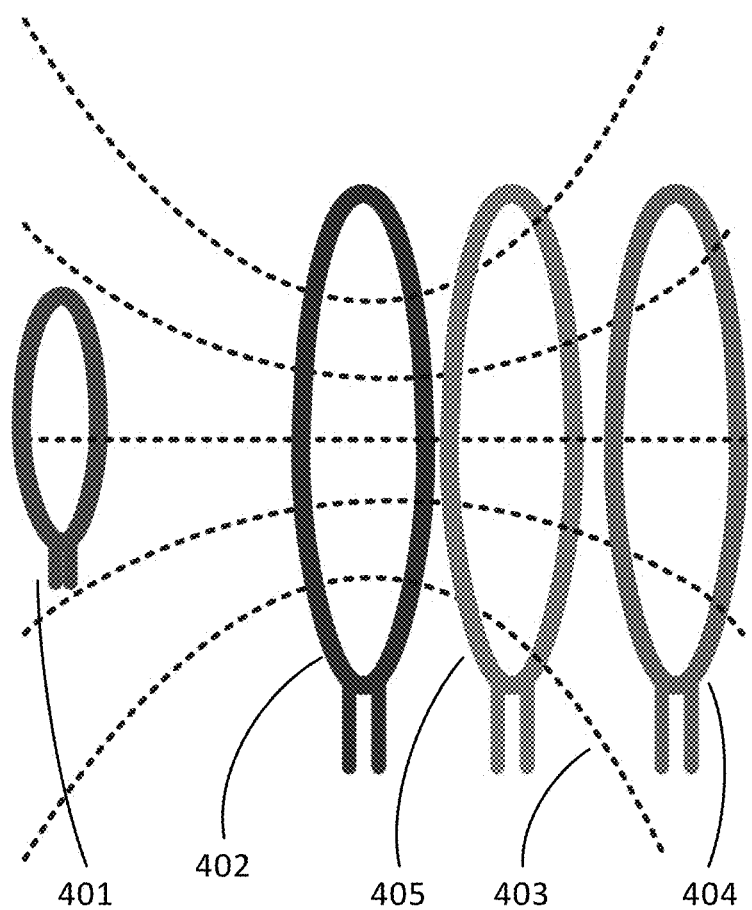
FIG. 4 is an illustration of antenna coupling.

The coupling coefficient reflects the degree of coupling between two antennas. It can be viewed as the percentage of magnetic flux generated by one antenna that passes through another antenna. Generally, the further apart are the antennas, the lower is the coupling coefficient, as shown in FIG. 4. Antenna 402 generates a magnetic field near Antenna 404 and 405. Because Antenna 405 is closer to Antenna 402 than Antenna 404, more magnetic flux 403 flows through Antenna 405 than through Antenna 404. As a result, the coupling coefficient between Antenna 405 and 402 is higher than that between Antenna 404 and 402. Moreover, the coupling coefficient is also related to the difference between sizes of the two antennas. For example, even if Antenna 401 and 404 are placed at the same distance from Antenna 402, a smaller amount of magnetic flux 403 passes through Antenna 401 than through Antenna 404, due to its smaller size.

Q-factor describes the frequency-selectivity and efficiency of a circuit at a given frequency, which could be calculated as:

$$Q = \frac{X}{R} \quad (3)$$

where X and R are the reactance and the resistance of the circuit, respectively. The higher the Q is, the more selective and higher efficient the circuit becomes, and vice versa. In the case of the antenna resonant circuit, the higher is the Q, the lower is the loss when oscillating.

The above analysis indicates four factors that collaboratively determine the wireless power transfer efficiency, which are the coupling coefficient, the Q-factor of the antenna resonant circuit of the reader $Q_1$, the Q-factor of the antenna resonant circuit of the tag $Q_2$, and the degree of impedance matching at the tag's end. Specifically, Coupling Coefficient k:

From Equation (1) and (2), tighter coupling between antennas leads to higher wireless power transfer efficiency. The coupling coefficient is determined by the relative position, and the size difference of the two antennas. It usually cannot be directly controlled by system designers, since it is much related to the nature of applications and the industrial design of the final product.

Q-Factor of the Antenna Resonant Circuit of the Reader $Q_1$:

According to the above analysis, higher $Q_1$ leads to higher wireless power transfer efficiency. Note that $Q_1$ is the Q-factor of the entire resonant circuit, which is collectively determined by the antenna Q-factor, the antenna driver ESR (Equivalent Series Resistance), and the loss of antenna matching circuit.

Q-Factor of the Antenna Resonant Circuit of the Tag $Q_2$:

According to the above analysis, higher $Q_2$ leads to higher wireless power transfer efficiency. Note that $Q_2$ is the Q-factor of the entire resonant circuit, which is collectively determined by the antenna Q-factor, and the loss of antenna matching circuit.

Impedance Matching of NFC Tag:

k and Q determines the maximum wireless power transfer efficiency a system can reach, but the actual efficiency is also determined by the degree of matching of the load impedance at tag to the source when seeing into the antenna matching circuit. Precise impedance matching is usually difficult on most systems due to load impedance variations.

Analysis of Load Modulation when Using Small Antennas

Figure 5:
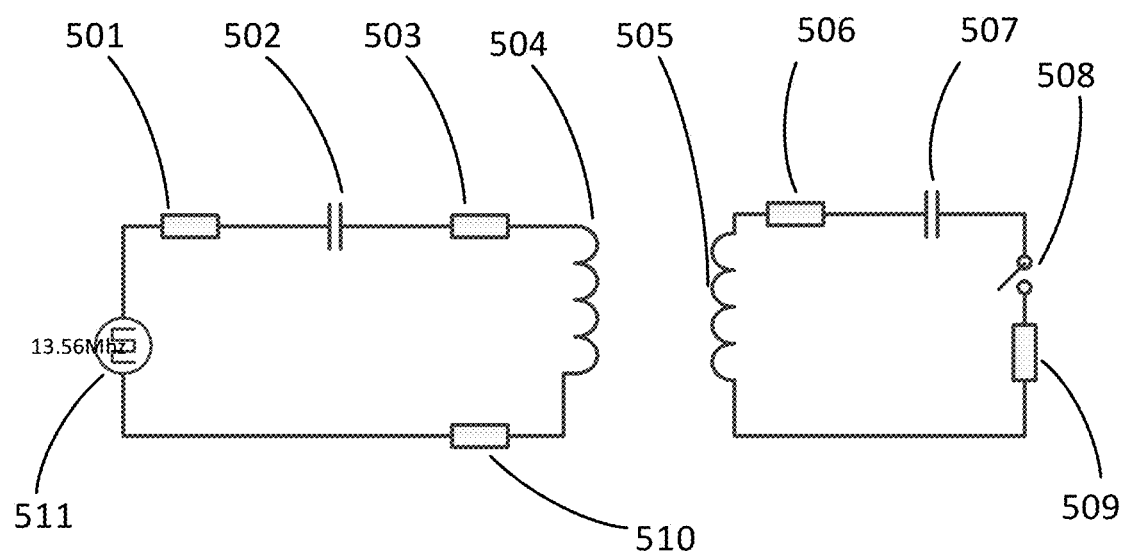
FIG. 5 is an equivalent antenna resonant circuit diagram of NFC systems.

For the majority of NFC systems, the bottleneck of NFC performance is the performance of the Tag->Reader communication link. FIG. 5 shows a typical NFC system, which is comprised of an NFC reader interface (left) and an NFC tag interface (right). To simplify the analysis, both antenna matching circuits of the two interfaces are comprised of a single tuning capacitor connected in series with the antenna. However, the analysis applies to all forms of matching circuit topologies. Antenna Driver 511 is an RF power amplifier, whose output impedance is represented as Resistor 501. Antenna 504 on the reader is matched to the Tuning Capacitor 502, which resonates at 13.56 MHz. Resistor 503 is the combined resistance of the Antenna 504 and the Tuning Capacitor 502. Antenna 505 on the tag is matched to the Tuning Capacitor 507, which resonates at 13.56 MHz. Resistor 506 is the combined internal resistor of the Antenna 505 and the Tuning Capacitor 507. RF Switch 508 constitutes the load modulator used for data transmission on the tag, whose impedance is represented as Resistor 509. When the NFC tag interface is placed in vicinity of the oscillating magnetic field generated by the NFC reader interface, the tag interface can be viewed as a load to the reader interface. To be specific, NFC tag could be represented as a resistor connected in series with the antenna of the reader, as illustrated as Resistor 510. This resistor is commonly called "Reflective Resistance." The value of this resistor is determined by many factors, including coupling coefficient between antennas, Q-factors of both resonant circuits, load to the tag interface, and etc. However, for any given reader interface and tag interface, when their relative position is fixed (coupling coefficient and Q-factors are thus fixed), the value of the reflective resistance only varies with the load to the tag interface. The variation of the load will vary the value of the reflective resistance. Therefore, a NFC reader can measure the change of the current flowing through its antenna to receive the data transmitted by the tag interface. This is the principle of load modulation.

Apparently, greater variations of reflective resistor 510 during load modulation will lead to stronger current change on the antenna of the NFC reader interface, which creates higher signal strength. The resistance of reflective resistor 510, when the antennas are resonant, can be expressed as:

$$Z_r = \frac{\omega^2 M^2}{R_2 + R_L},$$

where $\omega$ is the signal frequency, M is the mutual inductance of the two antennas, $R_2$ and $R_L$ are the resistance of and the load to the tag's antenna resonant circuit, respectively. Because $\omega$, M, and $R_2$ are constant during communication, the variation of $Z_r$ can be only generated by the change of $R_L$. Apparently, when the resistance of $R_L$ is switching between 0 and infinity, $Z_r$ has the highest variation. The maximum and minimum values of $Z_r$ can be expressed as:

$$\text{Max}(Z_r) = \frac{\omega^2 M^2}{R_2},$$

when $$R_L = 0$$

$$\text{Min}(Z_r) = \frac{\omega^2 M^2}{R_2 + \infty} = 0,$$

when $$R_L \to +\infty$$

The signal strength generated by load modulation, H, can be written as the ratio between the impedance variation caused by load modulation and the maximum impedance on the reader's antenna resonant circuit:

$$H = \frac{\text{Max}(Z_r) - \text{Min}(Z_r)}{R_1 + \text{Max}(Z_r)} = \frac{\frac{\omega^2 M^2}{R_2 R_1}}{1 + \frac{\omega^2 M^2}{R_2 R_1}} = \frac{k^2 Q_1 Q_2}{4\pi^2 + k^2 Q_1 Q_2} \quad (3)$$

Where $R_1$ is the equivalent series resistance (ESR) of the reader's antenna resonant circuit, i.e., the sum of Resistor 501 and Resistor 503, $Q_1$ and $Q_2$ are the Q-factors of antenna resonant circuits of the reader interface and the tag interface, respectively. The maximum and minimum signal strengths are achieved when H is equal to 1 and 0, respectively.

The dimension of antennas mainly affects the coupling coefficient k between the antennas of the reader and the tag. For a given distance between antennas, smaller antennas lead to a lower coupling coefficient. According to Equation (3), a low coupling coefficient will lower the tag->reader signal strength H, which may cause the NFC reader interface to drop the frame due to low SNR (signal-to-noise ratio).

Based on the above analysis, there are a few methods to deal with the low coupling coefficient caused by small antennas:

(1) Improving the Q-factor of the reader's antenna resonant circuit, $Q_1$. According to Equation (3), increasing $Q_1$ would improve the tag->reader signal strength H. $Q_1$ is the combined Q-factor of the entire antenna resonant circuit, which is determined collaboratively by the Q-factor of the antenna, the ESR of matching circuit and the antenna driver, and etc.

(2) Improving the Q-factor of the tag's antenna resonant circuit, $Q_2$. According to Equation (3), increasing $Q_2$ would improve the tag->reader signal strength H. $Q_2$ is the combined Q-factor of the entire antenna resonant circuit, which is determined collaboratively by the Q-factor of the antenna, the ESR of matching circuit, and etc.

(3) Adjusting the resistance switching range of load $R_L$. According to Equation (3), increasing the range that $R_L$ could switch would improve the tag->reader signal strength H. In most cases, the maximum and minimum values of $R_L$ are determined by the characteristics of the load switch in the load modulator. To improve H, the load switch has a small input capacitance, high isolation, and a low insertion loss.

From the above analysis, the common solution for improving wireless power transfer efficiency and communication performance when using small antennas, is to improve the Q-factors of both reader and tag interfaces. However, for communication, having high Q-factor will also decrease available communication bandwidth, lowering communication data rate.

The present invention discloses a method for using multiple antenna resonant circuits with different Qs to satisfy the contradicting requirements. The invention uses low Q antenna resonant circuits for the reader->tag link communication, and uses high Q antenna resonant circuits for the tag->reader link communication and wireless power transfer. Because a reader usually has much higher processing power than a tag due to its abundant energy, the NFC reader can perform sophisticated signal processing on a received signal to mitigate the distortion caused by the low bandwidth.

NFC Reader in One Embodiment of the Invention

Figure 6:
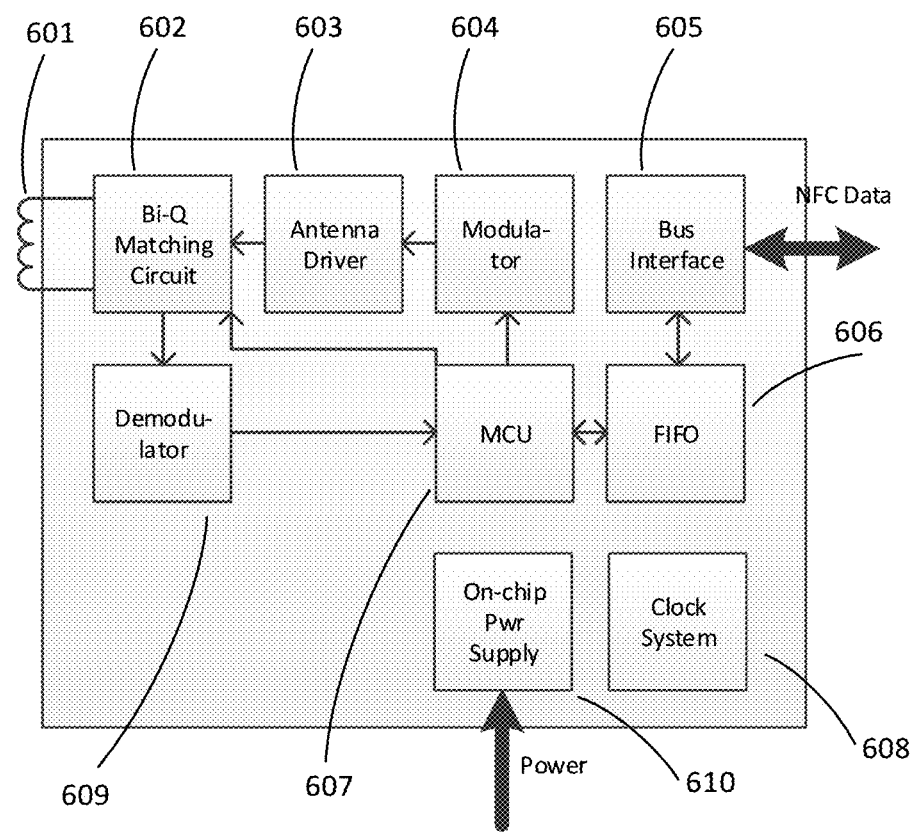
FIG. 6 illustrates the architecture of an NFC reader optimized for working with small antennas and wireless power transfer in one embodiment of the invention.

FIG. 6 shows the architecture of a NFC reader in one embodiment of the invention. Antenna 601 is a high Q (Q>100) antenna, which creates an oscillating magnetic field and receives a NFC signal from a NFC tag. The Bi-Q Matching Circuit 602 transforms the impedance of the Antenna 601 to a proper level, and has two working modes: a low-Q mode and a high-Q mode. These two modes adjust the Q-factor of the antenna resonant circuits to a low Q (Q≤25) and a high Q (Q≥50) to optimize performance, respectively. Modulator 604 creates modulated NFC signal superimposed on a 13.56 MHz carrier according to the NFC data to be transmitted, and feeds the signal to Antenna Driver 603. The driver 603 has low output impedance for improving power efficiency, and drives the Antenna 601 through the Bi-Q Matching Circuit 602. Demodulator 609 measures and tracks the current flowed through the antenna, and demodulates the signal. MCU 607 controls and oversees the operation of the entire NFC reader. Its tasks include packing and de-packing NFC frames, verifying data, communicating with external devices via a bus, controlling various on-chip components, and etc. Bus Interface 605 is the communication port for exchanging data with external devices, and is usually in the form of UART, SPI, or I2C. FIFO 606 serves as the bridge between Bus Interface 605 and MCU 607. Clock System 608 generates all clocks used on the NFC reader, including the 13.56 MHz carrier frequency. The On-chip Power Supply provides power for all on-chip components.

Different from a conventional NFC reader design, the disclosed NFC reader design has an antenna resonant circuit with two working modes, i.e., the high-Q mode and the low-Q mode. When working in the high-Q mode, the antenna resonant circuit has a high Q-factor but a low bandwidth. The 13.56 MHz carrier signal could be emitted at a very low loss, which is well suited for wireless power transfer. When working in the low-Q mode, the antenna resonant circuit has a low Q-factor but a high bandwidth, which is especially suitable for NFC signal transmission. These two modes could be switched in real time by the MCU. The NFC reader design is completely compatible with current NFC standards.

Figure 7:
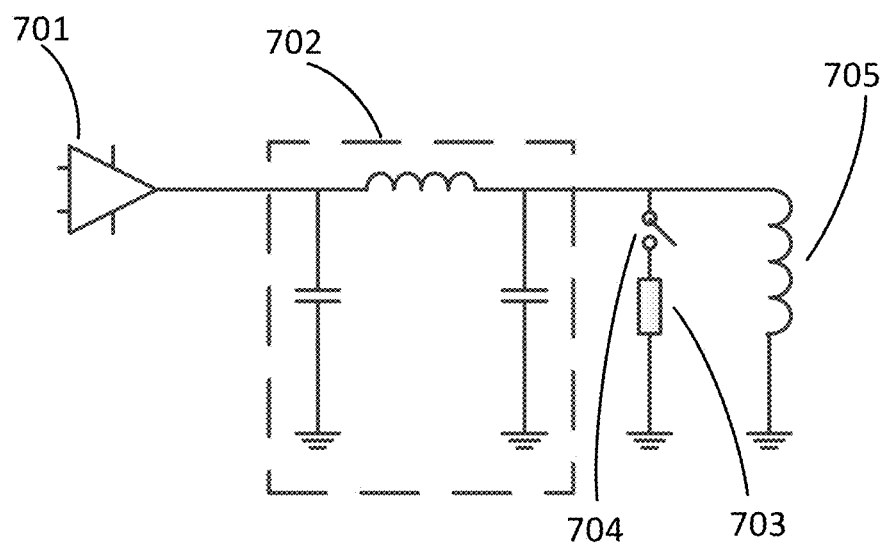
FIG. 7 illustrates the architecture of the antenna resonant circuit of the NFC reader optimized for working with small antennas and wireless power transfer.

FIG. 7 shows one implementation of the reader's antenna resonant circuit. Antenna Driver 701, which is Antenna Driver 603 shown in FIG. 6, is a low output impedance (<5 Ohm) RF power amplifier. Antenna Matching Circuit 702, Q Adjustment Resistor 703, and RF Switch 704 constitute the Bi-Q Matching Circuit 602 shown in FIG. 6. Antenna Matching Circuit 702 transforms the impedance of the Antenna 705 to a suitable level for power and efficiency control. As Antenna Matching Circuit 702 introduces loss, it is as simple as possible to improve efficiency. FIG. 7 shows the Antenna Matching Circuit 702 as a PI matching circuit, however, any other simple forms could be employed as well, like L-pad and single capacitor. The Antenna Matching Circuit 702 has an insertion loss smaller than or equal to 1 db to improve the Q-factor of the antenna resonant circuit in high-Q mode. Q Adjustment Resistor 703, together with RF Switch 704, controls the working mode of the antenna resonant circuit. To be specific, when RF Switch 704 is open, the antenna resonant circuit is in the high-Q mode, and vice versa. The actual resistance of Q Adjustment Resistor 703 is computed according to the characteristics of other components in the circuit.

Antenna 705, which is Antenna 601 shown in FIG. 6, is designed to achieve optimum wireless power transfer efficiency and communication performance. First, Antenna 705 resonates at around 13.56 MHz. Due to the limitation of practical tuning capacitors, the existence of parasitic capacitance, and the mutual inductance caused by the tag antenna, the inductance of Antenna 705 cannot be too large. On the other hand, too small inductance leads to a low Q and low efficiency. Therefore, the optimal inductance value is within 1 uH to 10 uH. Second, Antenna 705 has a sufficiently high Q. This could be achieved by using wider and thicker antenna tracks, low impedance antenna wires, and low RF loss base materials. Third, Antenna 705 has a size that is proper for providing sufficient coupling. For typical applications, an area in the range of 100 $mm^2$ to 5000 $mm^2$ would be sufficient.

Figure 8:
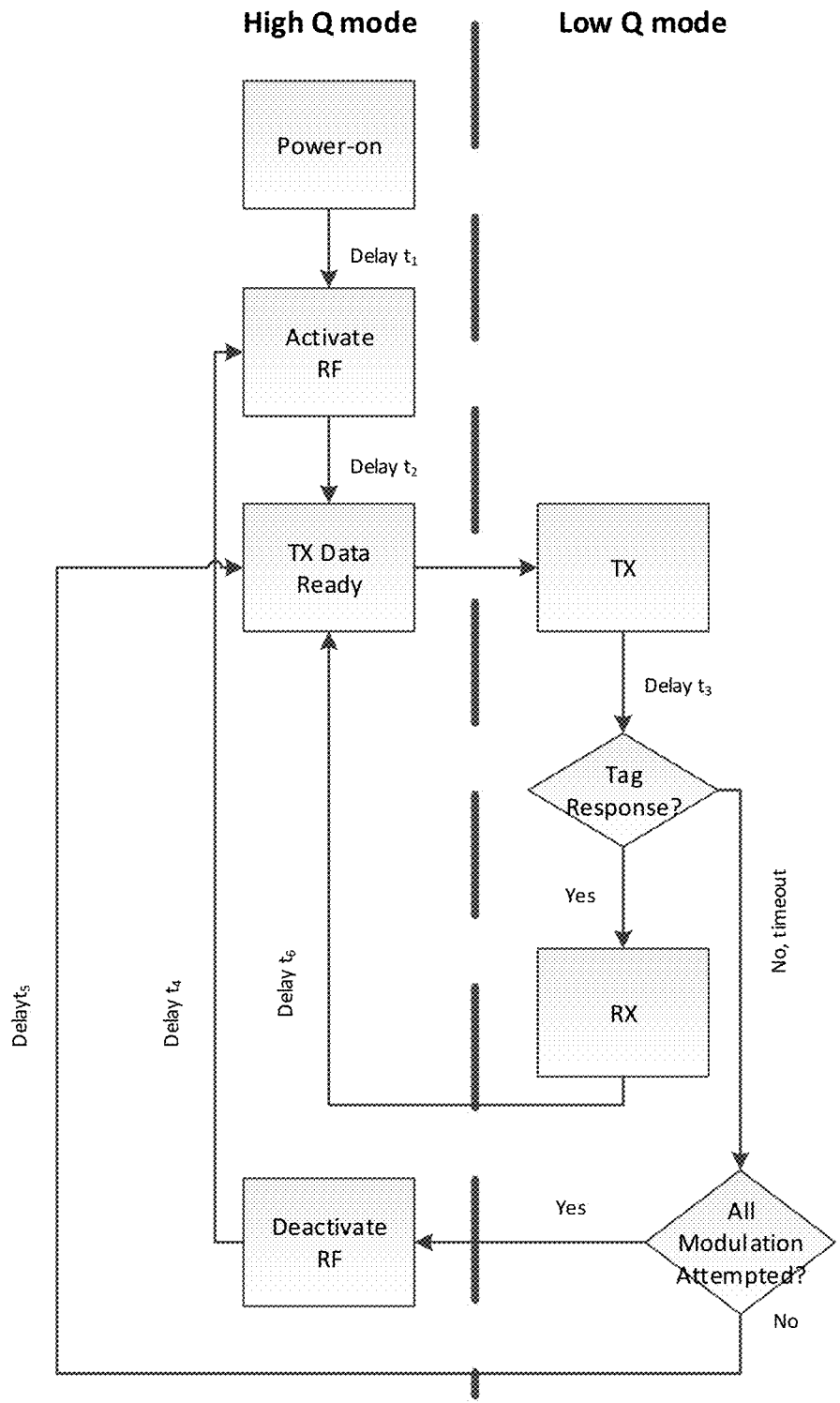
FIG. 8 is the state machine transitional chart of the NFC reader optimized for working with small antennas and wireless power transfer.

The disclosed NFC reader design adjusts its working mode in real time in accordance to its current state. It spends most of the time in the high-Q mode for supporting high-efficient wireless power transfer. FIG. 8 shows the state machine transition of the disclosed NFC reader design. The initial working mode after device powering up is the high-Q mode. A time t1 after the power-up event, MCU activates the RF interface by enabling the modulator, the antenna driver, along with a few other peripheral components. It then generates the unmodulated 13.56 MHz carrier, which is radiated via the RF interface. This carrier generates an oscillating magnetic field around the antenna, which can be utilized to power nearby NFC tags. The NFC reader has to wait at least t2 time after RF interface activation before it can transmit any data, which ensures nearby NFC tags harvest sufficient energy for proper operation. Then the NFC reader switches to the low-Q mode to start data transmission, and switches back to the high-Q mode immediately after transmission. It then waits for t3 time after transmission for tag response. If there is a response, the NFC reader has to wait for t6 time in the high-Q mode before entering the low-Q mode for transmitting the next data frame. Otherwise the NFC reader switches to another modulation scheme and attempts transmission again after t5 time, in order to detect tags that support different modulation schemes. If the NFC reader has attempted all modulations but has still received no response, it determines that there is no tag nearby and deactivates its RF interface to save energy. The NFC reader waits t4 time and repeats all above process to detect new tags. The value of t1 guarantees that all the components on the reader are properly prepared for the subsequent RF communications. The time t4 is determined according to a maximum allowed tag detection delay and an energy budget, and has a value between 0.1s to 1s. The time t2 is to ensure that the tag receives sufficient energy from the reader to perform the subsequent communications, and is at least 5 ms. The values of t3, t5, and t6 may respectively be the same as the Frame delay time PCD to PICC, Request Guard Time, and Frame delay time PICC to PCD as defined in the ISO14443-3 standard.

First Embodiment of NFC Tag

Figure 9:
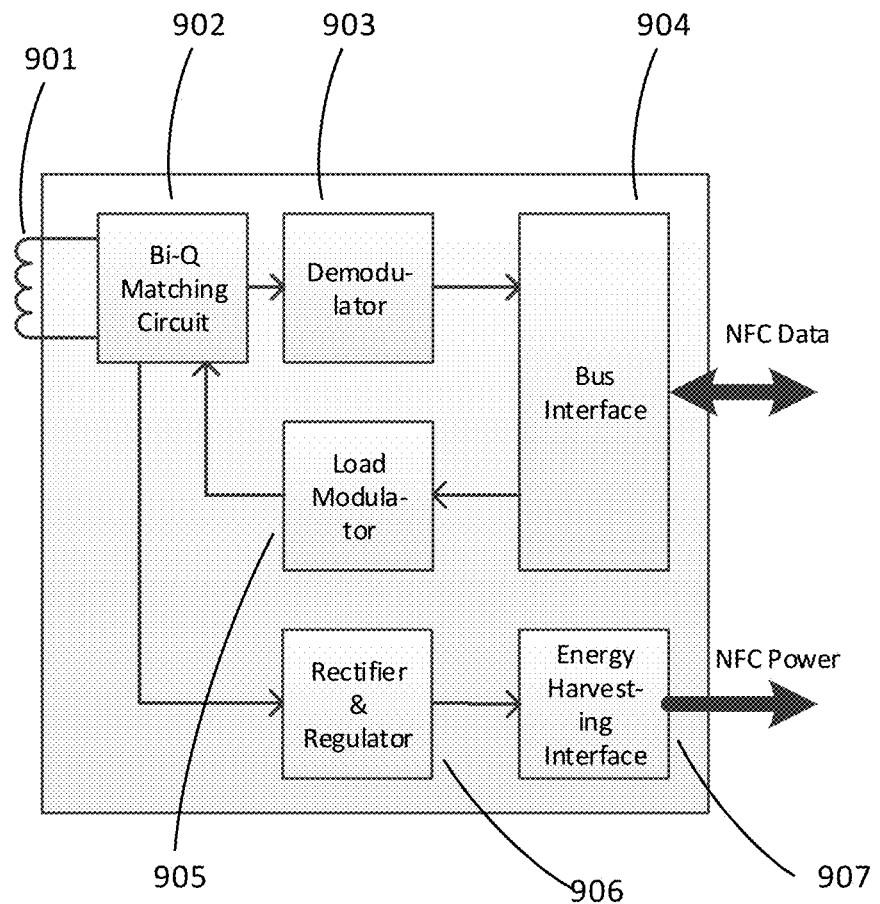
FIG. 9 illustrates the architecture of a first NFC tag optimized for working with small antennas and wireless power reception in one embodiment of the invention.

FIG. 9 shows the architecture of a NFC tag interface in one embodiment of the invention. Antenna 901 is a loop antenna with a high Q, which receives the wireless power and NFC signals transmitted by a nearby NFC reader, as well as transmits NFC signals. Bi-Q Matching Circuit 902 adjusts the impedance of Antenna 901 to a proper value. It has two working modes, i.e., a high-Q mode and a low-Q mode, which can tune the Q-factor of the antenna resonant circuit to a high ($Q \geq 50$) and low ($Q \leq 25$) value, respectively. Demodulator 903 demodulates the NFC signals received by Antenna 901. Load Modulator 905 modulates the load to Antenna 901 in order to transmit the signal. Bus Interface 904 connects to external devices via a system data bus, and is used for exchanging NFC data and configuring the NFC tag interface. Rectifier and Regulator Circuit 906 converts the RF energy that Antenna 901 harvested to a regulated DC power, which could be used for powering the tag interface, and external devices via Energy Harvest Interface 907. A power switch is present in the Rectifier and Regulator Circuit 906 to control the energy path to the Energy Harvest Interface 907.

Unlike a conventional NFC tag design, the disclosed NFC tag design has a bi-Q antenna resonant circuit, which can work in the high-Q mode and the low-Q mode. When working in the high-Q mode, the antenna resonant circuit has a high Q-factor but a low bandwidth. The 13.56 MHz carrier signal could be received at a very low loss, which is well suited for wireless power reception (a.k.a., energy harvesting). When working in the low-Q mode, the antenna resonant circuit has low a Q-factor but a high bandwidth, which is especially suitable for NFC signal reception. These two modes could be switched in real time. The disclosed NFC tag design is completely compatible with current NFC standard.

Figure 10:
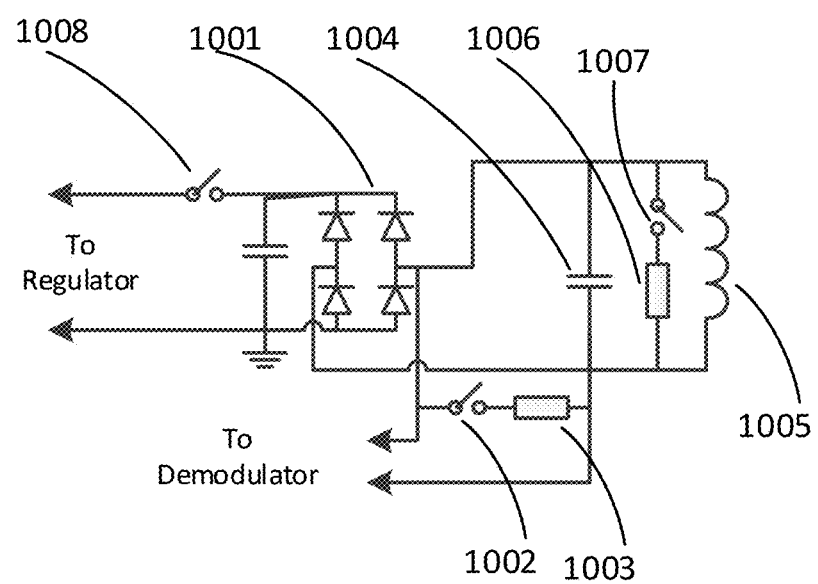
FIG. 10 illustrates the architecture of the antenna resonant circuit of the first NFC tag.

FIG. 10 shows one implementation of the tag's antenna resonant circuit. Antenna 1005 (i.e., Antenna 901 in FIG. 9) and Antenna Matching Circuit 1004 comprise the antenna resonant circuit. As Antenna Matching Circuit 1004 introduces loss, it is as simple as possible to improve efficiency. FIG. 10 shows the Antenna Matching Circuit 1004 as a single parallel capacitor. However, any other simple forms could be employed as well, like the L-pad and PI/T matching network. Resistor 1006 and RF Switch 1007 work as a Q-factor adjustment circuit. The on and off states of RF Switch 1007 correspond to the low-Q and high-Q modes, respectively. The value of Resistor 1006 is determined by the characteristics of Antenna 1005, Antenna Matching Circuit 1004, and RF Switch 1007, so that the Q value can be control to be no larger than 25 when RF Switch 1007 is closed. Antenna Matching Circuit 1004, Resistor 1006 and RF Switch 1007 constitute the Bi-Q Matching Circuit 902 shown in FIG. 9. Resistor 1003 and RF Switch 1002 comprise the load modulator (i.e., Load Modulator 905 in FIG. 9). Rectifier 1001 converts the RF energy that Antenna 1005 receives to DC power, and feeds the power to a regulator circuit via Power Switch 1008, which controls the connection of the external load to the rectifier. Rectifier 1001, Power Switch 1008, and the connected voltage regulator constitute the Rectifier and Regulator Circuit 906. Rectifier 1001 also connects with the demodulator.

Antenna 1005 is designed to reach optimum wireless power reception efficiency and communication performance. First, Antenna 1005 resonates at around 13.56 MHz. Due to the limitation of practical tuning capacitors, the existence of parasitic capacitance, and the mutual inductance caused by tag antenna, the inductance of Antenna 1005 cannot be too large. On the other hand, too small inductance leads to a low Q and low efficiency. Therefore, the optimal inductance value is within 1 uH to 10 uH. Second, Antenna 1005 has a sufficiently high Q. This could be achieved by using wider and thicker antenna tracks, low impedance antenna wires, and low RF loss base materials. Third, Antenna 1005 has a size that is proper for providing sufficient coupling. For typical applications, an area in the range of 100 mm² to 5000 mm² would be sufficient. A smaller Antenna is still able to communicate, but with lower performance (shorter distance, lower data rate, etc.).

Load modulator maximizes the switching range of load impedance to improve the communication performance of the tag->reader link, which could be achieved with a high isolation and a low on-resistance of RF Switch 1002. Typically an isolation value higher than 10 KOhm, and an on-resistance lower than 50 Ohm should be sufficient. RF Switch 1002 also has a sufficiently high power rating to handle the high power dissipation when switched. If the power rating is too low, Resistor 1003 is used for limiting the power dissipated on RF Switch 1002, however, at the expense of lowering the switching range. Due to the high frequency of the NFC subcarrier signal (848 KHz) that is to be transmitted, RF Switch 1002 has a switching speed higher than 1 MHz.

Figure 11:
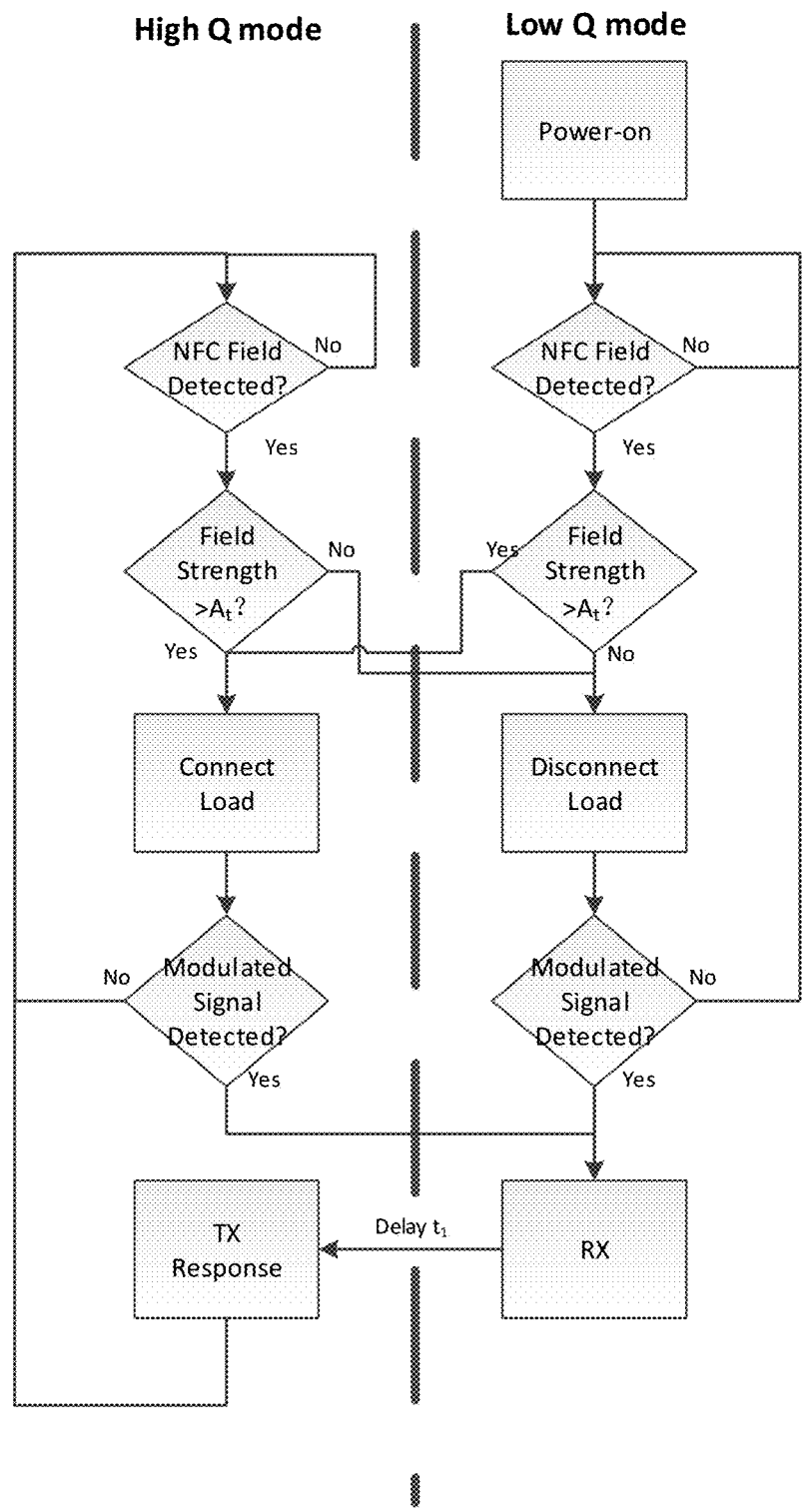
FIG. 11 is the state machine transitional chart of the first NFC tag.

The disclosed NFC tag design adjusts its working mode in real time in accordance to its current state. It spends most of the time in the high-Q mode for supporting high-efficient wireless power reception. FIG. 11 shows the state machine transition of the disclosed NFC tag design. The initial working mode after device powering up is the low-Q mode. After powering up, the tag stays in low power mode and continuously detects for NFC 13.56 MHz magnetic field. If it successfully detects a nearby field, it then measures if the field has strength stronger than $A_r$. If it does, the tag switches to the high-Q mode for wireless power reception and connects the load to a rectifier. Otherwise, it stays in low Q mode and disconnects the load. This mechanism prevents the wireless power reception from disrupting the communication when the field is too weak. Then the tag detects if there is a modulated signal transmitted by a nearby reader. If there is none, it stays in the current working mode, goes back to field detection, and repeats the above processes. If there is a modulated signal detected, it immediately switches to the low-Q mode, and receives the signal. After signal reception, it switches back to high Q mode, and transmits response signal using load modulation within t1 time. After transmission, the tag detects if the field is still present, and repeats all above processes if it does. Otherwise it switches back to the low-Q mode and repeat field detection. The values of t1 may be the same as the Frame delay time PICC to PCD defined in the ISO14443-3 standard.

$A_r$ is set according to the actual field strength when the NFC tag is close to the NFC reader. It has hysteresis, i.e., its value when a load is connected is lower than that when the load is unconnected. This prevents oscillating. The hysteresis value is determined according to the intended system load.

Because the modulation detection may be performed in the high-Q mode and the actual signal reception is performed in the low-Q mode, if the data rate is high, several modulation symbols may be missed during mode transition. Therefore, this disclosed NFC tag design can only support NFC protocols with a lower data rate.

Figure 15:
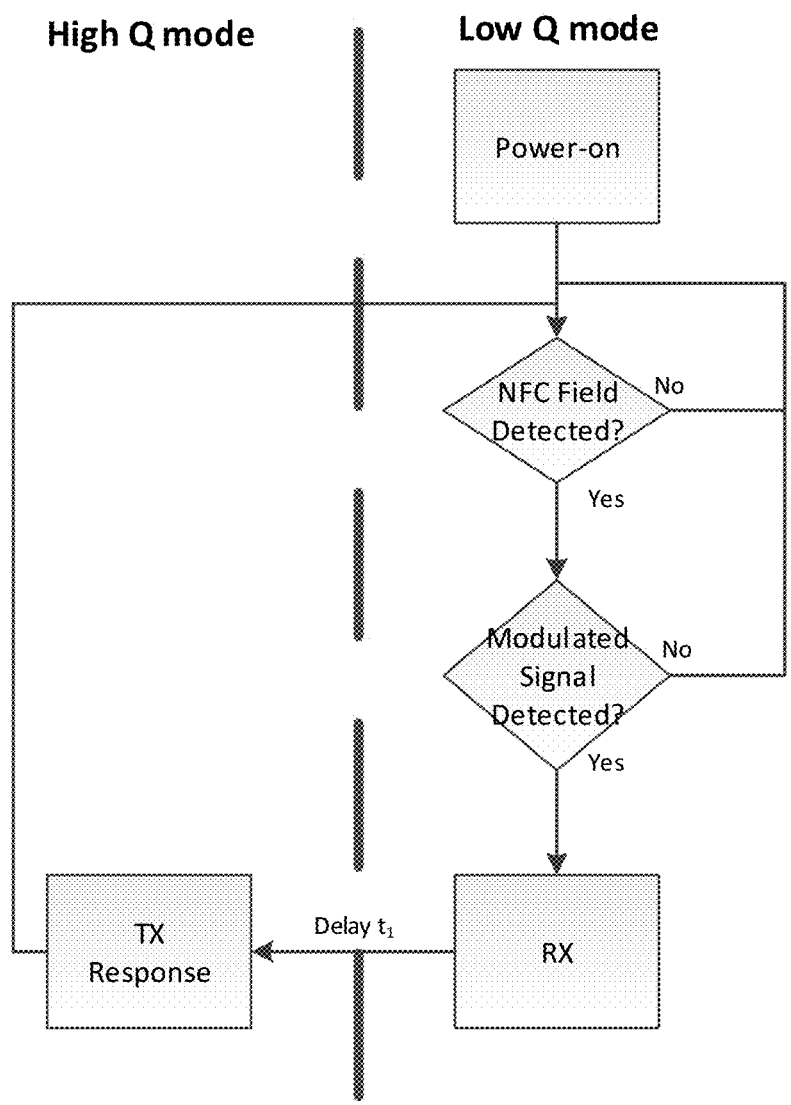
FIG. 15 is the state machine transitional chart of the first NFC tag when wireless power reception is not needed.

Sometimes NFC tag interfaces are battery powered (active tags), and do not need wireless power reception function. The state machine transition of these tag interfaces is shown in FIG. 15. The initial working mode after device powering up is the low-Q mode. After powering up, the tag stays in low power mode and continuously detects for NFC 13.56 MHz magnetic field. If it successfully detected a nearby field, it then detects if there is a modulated signal transmitted by the nearby reader. If there was none, it goes back to field detection, and repeats the above processes. If there is a modulated signal detected, it receives the signal. After signal reception, it switches to the high-Q mode, and transmits a response signal using load modulation within t1 time. After transmission, the tag goes back to the low-Q mode and detects if the field is still present, and repeats all above processes. The values of t1 may be the same as the Frame delay time PICC to PCD defined in the ISO14443-3 standard.

Second Embodiment of NFC Tag

Figure 12:
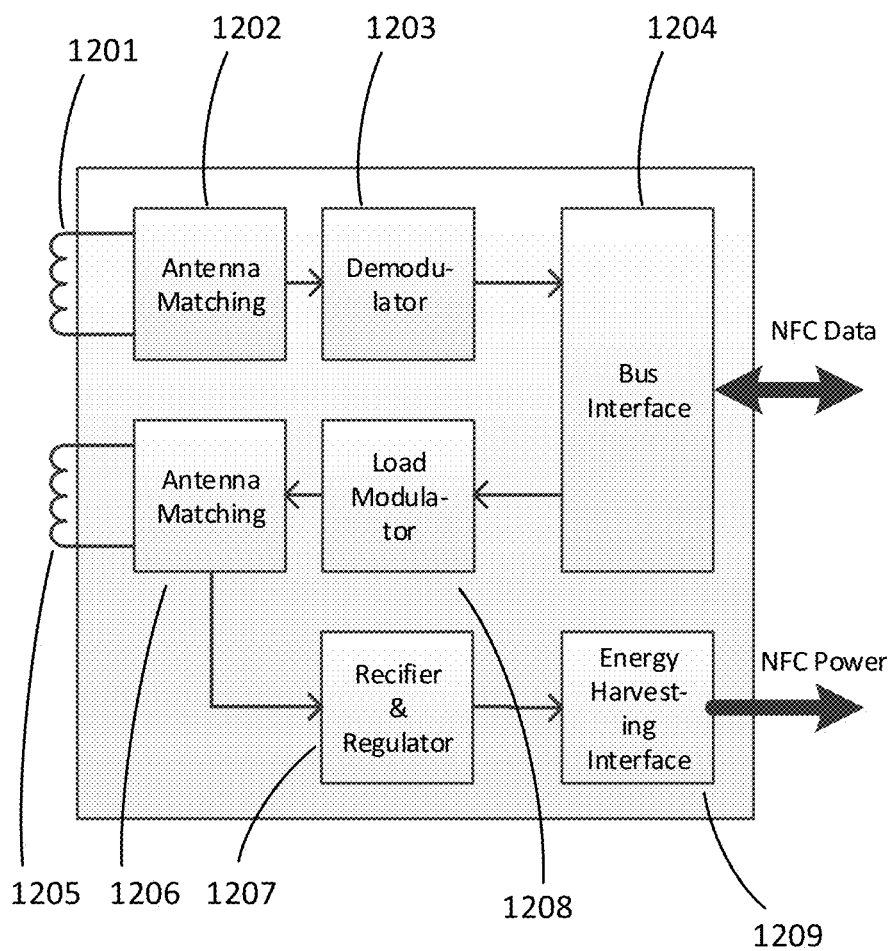
FIG. 12 illustrates the architecture of a second NFC tag optimized for working with small antennas and wireless power reception in another embodiment of the invention.

FIG. 12 shows the architecture of the NFC tag interface in another embodiment of the invention. The disclosed NFC tag design contains two antennas, Antenna 1201 and Antenna 1205, and two antenna resonant circuits. Antenna 1201 and Antenna Matching Circuit 1202 comprise the first antenna resonant circuit with a low Q (Q≤25), which is utilized to receive the NFC signal transmitted by nearby NFC readers. Antenna 1205 and Antenna Matching Circuit 1206 comprise the second antenna resonant circuit with a high Q (Q≥50), which is used to harvest nearby RF energy and perform load modulation. Demodulator 1203 demodulates the signal received by Antenna 1201, and sends the data to Bus Interface 1204, which connects with external devices via a data bus. Load Modulator 1208 modulates the load connected to Antenna 1205 according to the data received from the data bus. Bus Interface 1204 serves as the data exchanging hub for Demodulator 1203, Load Modulator 1208, and external devices. Rectifier and Regulator Circuit 1207 converts the RF energy that Antenna 1205 harvested to regulated DC power, which could be used for powering the tag interface, and external devices via Energy Harvest Interface 1209. A power switch is present in the Rectifier and Regulator Circuit 1207 to control the energy path to the Energy Harvest Interface 1209.

Unlike the conventional NFC tag design, the disclosed NFC tag design has two antenna resonant circuits that have a high Q and a low Q, respectively. With the low Q, the first antenna resonant circuit provides a high NFC reception bandwidth. With the high Q, the second antenna resonant circuit provides exceptional wireless power reception efficiency. The two antenna resonant circuits work together, which offers both high communication and wireless power reception performance. This disclosed NFC tag design can support all standard data rates, and is completely compatible with current NFC standards.

Figure 13:
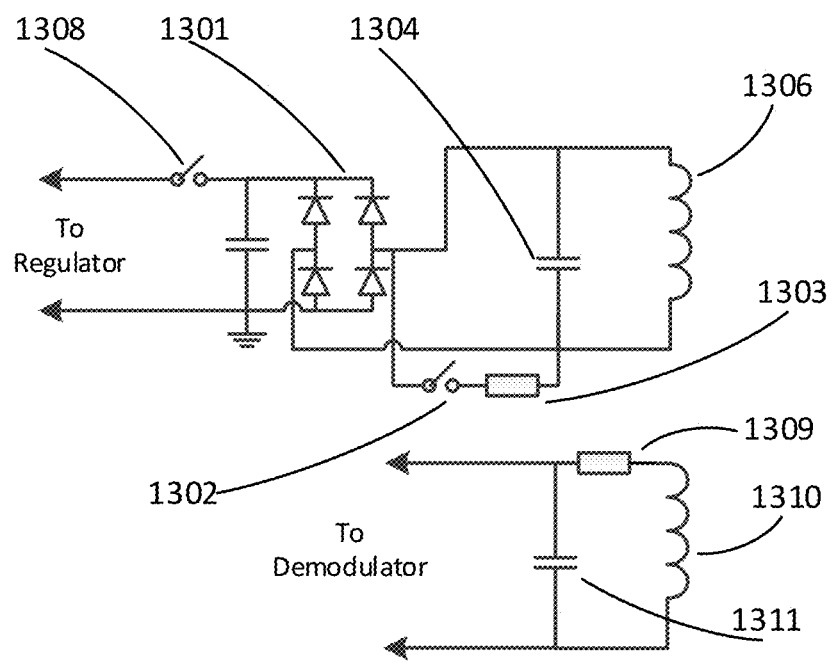
FIG. 13 illustrates the architecture of the antenna resonant circuit of the second NFC tag.

FIG. 13 shows one implementation of the antenna resonant circuits. Antenna 1310 (i.e., Antenna 1201 in FIG. 12), Capacitor 1311, and Resistor 1309 comprise the first antenna resonant circuit. Capacitor 1311 serves as the tuning capacitor to control the impedance of Antenna 1310 at 13.56 MHz. The purpose of Resistor 1309 is to lower the Q of the first antenna resonant circuit to be smaller than or equal to 25 if the Q of Antenna 1310 is too high. Capacitor 1311 and Resistor 1309 constitute the Antenna Matching Circuit 1202 shown in FIG. 12. The NFC demodulator connects with the first antenna resonant circuit. Antenna 1306 (i.e., Antenna 1205 in FIG. 12) and Antenna Matching Circuit 1304 (i.e., Antenna Matching Circuit 1206 in FIG. 12) comprise the second antenna resonant circuit. FIG. 13 shows the Antenna Matching Circuit 1304 as a single parallel capacitor—however, any other simple form could be employed as well, like L-pad and PI/T matching network. The Q of the second antenna resonant circuit is above 50. Resistor 1303 and RF Switch 1302 comprise the load modulator (i.e., Load Modulator 1208 in FIG. 12). Rectifier 1301 converts the RF energy that Antenna 1005 received to DC power, and feeds the power to a regulator circuit via Power Switch 1308, which controls the connection of the external load to the rectifier. Rectifier 1301, Power Switch 1308, and the connected voltage regulator constitute the Rectifier and Regulator Circuit 1207.

As only the second antenna resonant circuit can harvest the energy (the energy received by the first antenna resonant circuit is converted to heat), to improve wireless power reception efficiency, the energy that is received by the first antenna resonant circuit is sufficiently low. To be specific, the received signal strength is as low as possible, but higher than the reception sensitivity of the demodulator. There are a few methods to lower the reception voltage. First, lowering the Q of the first antenna resonant circuit at 13.56 MHz. This makes the circuit less sensitive to a 13.56 MHz signal. It could be done by increasing the value of Resistor 1309, or tuning the resonant frequency away from 13.56 MHz by carefully choosing the value of Capacitor 1311. Second, decreasing the inductance of the antenna. This reduces the mutual inductance between antennas of the reader and the first antenna resonant circuit, which decreases induced voltage. It could be achieved by using antennas with less loops or a smaller encompassed area. Third, decreasing the coupling between the antennas of the reader and the first antenna resonant circuit. This could be done by decreasing the area of the antenna, or moving the antenna away.

Load modulator maximizes the switching range of load impedance to improve the communication performance of the tag->reader link, which could be achieved with a high isolation and a low on-resistance of RF Switch 1302. Typically an isolation value higher than 10 KOhm, and an on-resistance lower than 50 Ohm should be sufficient. RF Switch 1302 also has sufficiently high power rating to handle the high power dissipation when switched. If the power rating is too low, Resistor 1303 is used for limiting the power dissipated on RF Switch 1302, however, at the expense of lowering the switching range. Due to the high frequency of the NFC subcarrier signal (848 KHz) that is to be transmitted, RF Switch 1302 has a switching speed higher than 1 MHz.

The second antenna resonant circuit is designed to reach optimum wireless power transfer efficiency and communication performance. First, the second antenna resonant circuit resonates at around 13.56 MHz. Due to the limitation of practical tuning capacitors, the existence of parasitic capacitance, and the mutual inductance caused by tag antenna, the inductance of Antenna 1306 cannot be too large. On the other hand, too small inductance leads to a low Q and low efficiency. Therefore, the optimal inductance value is within 1 uH to 10 uH. Second, the second antenna resonant circuit has a sufficiently high Q. This means high Q for Antenna 1306 and low loss for Antenna Matching Circuit 1304. High antenna Q could be achieved by using wider and thicker antenna tracks, low impedance antenna wires, and low RF loss base materials. Low matching circuit loss could be achieved by using simple matching topology, as more components mean more loss. Third, Antenna 1306 has a size that is proper for providing sufficient coupling. For typical applications, an area that is in the range of 100 mm$^2$ and 5000 mm$^2$ would be sufficient. Fourth, the output impedance of the second antenna matching circuit matches that of the load. This could be done by adjusting the impedance transformation of Antenna Matching Circuit 1304.

Figure 14:
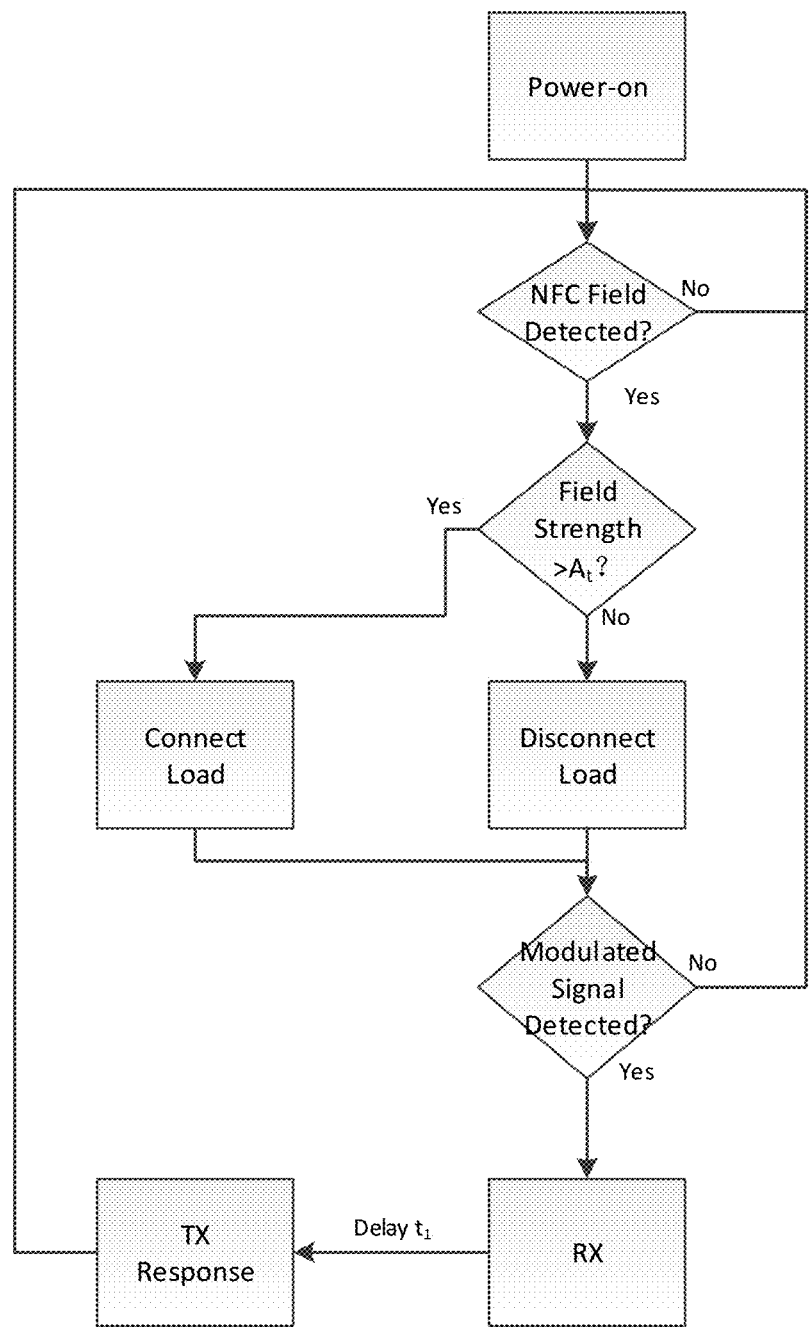
FIG. 14 is the state machine transitional chart of the second NFC tag.

FIG. 14 shows the state machine transition of the disclosed NFC tag design. After powering up, the tag works in a low power mode and continuously detects for a RF field. If a RF field is successfully detected, it tests if the field strength is higher than $A_t$. If it does, the tag connects the load to the rectifier and powers the load, otherwise it disconnects the load. This mechanism prevents the wireless power reception from disrupting the communication when the field is too weak. Then the tag detects if there is modulated signal transmitted by a nearby reader. If there is none, it goes back to field detection and repeats the above processes. If there is a modulated signal detected, it receives the signal. After signal reception, it transmits a response signal using load modulation within t1 time. After transmission, the tag detects if the field is still present, and repeats all above process if it does. $A_t$ is set according to the actual field strength when the NFC tag is close to the NFC reader. It has hysteresis, i.e., its value when load is connected is lower than that when the load is unconnected. This prevents oscillating. The hysteresis value is determined according to the intended system load. The values of t1 may be the same as the Frame delay time PICC to PCD defined in the ISO14443-3 standard.

The invention claimed is:

1. A near-field communication (NFC) tag for concurrent NFC and wireless power transfer (WPT) with an NFC reader, comprising:
    a high quality factor (Q-factor) antenna resonant circuit of which a Q-factor is no lower than 50,
    a low Q-factor antenna resonant circuit of which the Q-factor is no higher than 25, the high Q-factor and low Q-factor antenna resonant circuits having no shared component;
    a modulator connected to the high Q-factor antenna resonant circuit to perform load modulation;
    a demodulator connected to the low Q-factor antenna resonant circuit to demodulate a signal received by the low Q-factor antenna resonant circuit; and
    an interface that is connected to both the modulator and the demodulator, and serves as a data exchange hub for the modulator and the demodulator to communicate with an external device connected to the NFC tag, wherein
    the NFC tag is configured to
        receive a first NFC signal transmitted by the NFC reader using the low Q-factor antenna resonant circuit and demodulating the first NFC signal using the demodulator, and
        receive energy contained in an NFC radio frequency (RF) magnetic field transferred by the NFC reader in the WPT and transmit a second NFC signal to the NFC reader, both using the high Q-factor antenna resonant circuit, the second NFC signal being an amplitude modulated signal modulated by the modulator.

2. The NFC tag of claim 1, wherein the NFC tag is powered by the energy received through the WPT, and is configured to power the external device connected thereto.

3. The NFC tag of claim 1, wherein the high Q-factor and low Q-factor antenna resonant circuits are configured to be activated simultaneously.

4. A method for a near-field communication (NFC) tag to perform NFC and wireless power transfer (WPT) with an NFC reader, the NFC tag having
    a high quality factor (Q-factor) antenna resonant circuit, of which a Q-factor is no lower than 50,
    a low Q-factor antenna resonant circuit, of which the Q-factor is no higher than 25, the high Q-factor and low Q-factor antenna resonant circuits having no shared component,
    a modulator connected to the high Q-factor antenna resonant circuit to perform load modulation, a demodulator connected to the low Q-factor antenna resonant circuit to demodulate a signal received by the low Q-factor antenna resonant circuit, and an interface that is connected to both the modulator and the demodulator, and serves as a data exchange hub for the modulator and the demodulator to communicate with an external device connected to the NFC tag, the method comprising:

repeatedly preforming steps of detecting an NFC radio frequency (RF) field generated by the NFC reader using the low Q-factor antenna resonant circuit and the demodulator;

measuring strength of the NFC RF field, upon determining that the strength of the NFC RF field is higher than a predetermined threshold that has a fixed hysteretic value preset based on a load level of the external device, performing the WPT using the high Q-factor antenna resonant circuit, and transmitting a response back to the NFC reader using the high Q-factor antenna resonant circuit, the response being an amplitude modulated signal modulated by the modulator.

5. The method of claim 4, wherein the NFC tag is configured to supply power to the external device, and, after determining that the strength of the NFC RF field is higher or lower than the predetermined threshold, connects or disconnects the power supply to the external device, respectively.

6. The method of claim 4, wherein after the signal reception, the NFC tag switches transmits the response within a time t1, t1 being smaller than a maximum time interval between a transmission time by the NFC reader and a response time by the NFC tag as defined in ISO14443 standards.

* * * * *